US012731900B2

(12) United States Patent
Fang et al.

(10) Patent No.: US 12,731,900 B2

(45) Date of Patent: Sep. 8, 2026

(54) ANTENNA HAVING RADIATION PATCH

(71) Applicants: Beijing BOE Technology Development Co., Ltd., Beijing (CN); BOE TECHNOLOGY GROUP CO., LTD., Beijing (CN)

(72) Inventors: Jia Fang, Beijing (CN); Feng Qu, Beijing (CN); Shiqiao Zhang, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 802 days.

(21) Appl. No.: 17/920,840

(22) PCT Filed: Oct. 27, 2021

(86) PCT No.: PCT/CN2021/126591

§ 371 (c)(1),
(2) Date: Oct. 24, 2022

(87) PCT Pub. No.: WO2023/070350

PCT Pub. Date: May 4, 2023

(65) Prior Publication Data

US 2024/0222869 A1 Jul. 4, 2024

(51) Int. Cl.
*H01Q 21/24* (2006.01)
*H01P 1/18* (2006.01)
(Continued)

(52) U.S. Cl.
CPC ............ *H01Q 9/0428* (2013.01); *H01P 1/18* (2013.01); *H01P 5/024* (2013.01)

(58) Field of Classification Search
CPC ...... H01Q 9/0428; H01Q 1/38; H01Q 9/0435; H01Q 21/00; H01Q 21/24; H01P 1/18; H01P 5/024
See application file for complete search history.

(56) References Cited

U.S. PATENT DOCUMENTS 4,035,807 A * 7/1977 Tang .................... H01Q 21/064 343/768
4,125,838 A * 11/1978 Kaloi .................. H01Q 9/0428 343/846

(Continued)

FOREIGN PATENT DOCUMENTS

CN 102064380 A * 5/2011 ............... H01Q 1/36
CN 102255138 A 11/2011

(Continued)

OTHER PUBLICATIONS

Shahabadi, et al., "Low-Cost, High-Efficiency Quasi-Planar Array of Waveguide-Fed Circularly Polarized Microstrip Antennas from Mahmoud Shahabadi," IEEE Transactions on Antennas and Propagation, Jun. 6, 2005, vol. 53, No. 6, pp. 2036-2043.

*Primary Examiner* — Dimary S Lopez Cruz
*Assistant Examiner* — Bamidele A Immanuel
(74) *Attorney, Agent, or Firm* — HOUTTEMAN LAW LLC

(57) ABSTRACT

The present disclosure provides an antenna, and belongs to the field of radio frequency technology. The antenna provided by the present disclosure includes: a dielectric substrate, and a radiation patch and a waveguide feed structure, which are respectively disposed on two opposite sides of the dielectric substrate; an orthographic projection of a first transmission port of the waveguide feed structure on the dielectric substrate at least partially overlaps that of the radiation patch on the dielectric substrate; and the radiation patch is configured to convert a linearly polarized radiation (Continued)

signal transmitted via the first transmission port into a circularly polarized radiation signal. The antenna can realize conversion of the linearly polarized radiation signal into the circularly polarized radiation signal by adopting the radiation patch, so that a space occupied by the radiation patch can be reduced, thereby avoiding an increase in a thickness of the antenna.

18 Claims, 10 Drawing Sheets

(51) Int. Cl.
*H01P 5/02* (2006.01)
*H01Q 9/04* (2006.01)

(56) References Cited

U.S. PATENT DOCUMENTS 4,673,946 A * 6/1987 Hoover .................. H01P 5/082 343/776
4,792,810 A * 12/1988 Fukuzawa .......... H01Q 21/0081 343/778
4,843,400 A * 6/1989 Tsao ..................... H01Q 21/065 343/700 MS
5,173,711 A * 12/1992 Takeuchi ............. H01Q 9/0421 343/846
5,481,272 A * 1/1996 Yarsunas ................ H01Q 19/10 343/789
5,517,203 A * 5/1996 Fiedziuszko ........... H01Q 19/17 343/756
5,661,494 A * 8/1997 Bondyopadhyay .... H01Q 1/364 343/700 MS
5,861,848 A * 1/1999 Iwasaki ................ H01Q 9/0435 343/769
5,940,036 A * 8/1999 Oliver .................. H01Q 9/0485 333/219.1
6,147,647 A * 11/2000 Tassoudji ............... H01Q 21/28 333/219.1
6,166,692 A * 12/2000 Nalbandian .......... H01Q 9/0428 343/770
6,201,508 B1 * 3/2001 Metzen .................. H01Q 21/00 343/778
6,377,224 B2 * 4/2002 Gomez-Henry ......... H01Q 5/47 343/772
6,392,602 B2 * 5/2002 Kawahata .............. H01Q 1/243 343/702
8,912,858 B2 * 12/2014 Dayan ..................... H01P 5/107 333/26
9,419,341 B2 * 8/2016 Jafarlou ................. H01Q 13/02
12,155,106 B2 * 11/2024 Fang ....................... H01P 3/081
12,199,367 B2 * 1/2025 Wang ....................... H01Q 3/36
2001/0048392 A1 * 12/2001 Kawahata .............. H01Q 1/243 343/700 MS
2003/0151550 A1 * 8/2003 Chen .................... H04B 7/2041 342/372
2004/0233107 A1 * 11/2004 Popov .................. H01Q 9/0492 343/700 MS
2008/0079637 A1 * 4/2008 Okamura ............... H01Q 1/243 343/700 MS
2010/0085133 A1 * 4/2010 Nomura .................. H01P 5/107 333/248
2015/0194730 A1 * 7/2015 Sudo ...................... H01Q 5/378 343/905
2015/0288075 A1 * 10/2015 Milroy ................... H01Q 25/02 343/852
2016/0351988 A1 * 12/2016 Yang ......................... H01P 5/08
2017/0338571 A1 * 11/2017 Moosbrugger ...... H01Q 9/0435
2018/0358677 A1 * 12/2018 Artemenko ............. H01P 1/042
2020/0059005 A1 * 2/2020 Wu ...................... H01Q 9/0435
2020/0194899 A1 * 6/2020 Lu ........................ H01Q 15/244
2020/0257149 A1 * 8/2020 Li ......................... G02F 1/1313
2020/0295437 A1 * 9/2020 Ueda .................... H01Q 9/0407
2020/0303802 A1 * 9/2020 Hsiao ......................... H01P 3/16
2021/0005981 A1 * 1/2021 Kuwabara ............ H01Q 21/064
2021/0203076 A1 * 7/2021 Boin ...................... H01Q 1/288
2023/0098813 A1 * 3/2023 Fang .......................... G02F 1/13 342/372
2024/0250434 A1 * 7/2024 Wang ................... H01Q 21/065

FOREIGN PATENT DOCUMENTS

CN 105006631 A * 10/2015 ............... H01Q 1/22
CN 105006656 A * 10/2015 ............... H01Q 1/22
CN 105356054 A * 2/2016 ............. H01Q 13/20
CN 207938785 U 10/2018
CN 109149117 A * 1/2019 ........... H01Q 13/106
CN 111864317 A 10/2020
CN 212571362 U * 2/2021 ............... H01Q 1/36
CN 112490656 A * 3/2021 ............. H01Q 9/045
RU 2067341 C1 * 9/1996

* cited by examiner

ANTENNA HAVING RADIATION PATCH

CROSS-REFERENCE TO RELATED APPLICATION

This is a National Phase Application filed under 35 U.S.C. 371 as a national stage of PCT/CN2021/126591, filed on Oct. 27, 2021.

TECHNICAL FIELD

The present disclosure belongs to the field of radio frequency technology, and particularly relates to an antenna.

BACKGROUND

At present, a circularly polarized antenna based on waveguide feed generally includes a pre-feed structure, a rectangular waveguide feed structure and a radiating element, the pre-feed structure transmits a radio frequency signal to the rectangular waveguide feed structure, and the rectangular waveguide feed structure feeds the radio frequency signal into the radiating element. Since the radio frequency signal transmitted by the rectangular waveguide feed structure is generally in the form of linearly polarized radiation signal, the radiating element adopts a waveguide rectangular-to-circular converter to convert a linearly polarized radiation signal from an output end of the rectangular waveguide feed structure into a circularly polarized radiation signal, so as to match with the rectangular waveguide feed structure. The waveguide rectangular-to-circular converter is relatively large in size, particularly in longitudinal dimension, resulting in a relatively large thickness of the antenna.

SUMMARY

For solving at least one of the technical problems in the prior art, the present disclosure provides an antenna, which can realize conversion of a linearly polarized radiation signal into a circularly polarized radiation signal by adopting a radiation patch, so that a space occupied by the radiation patch can be reduced, thereby avoiding an increase in a thickness of the antenna.

In a first aspect, an embodiment of the present disclosure provides an antenna, including: a dielectric substrate, and a radiation patch and a waveguide feed structure, which are respectively disposed on two opposite sides of the dielectric substrate; wherein

- an orthographic projection of a first transmission port of the waveguide feed structure on the dielectric substrate at least partially overlaps that of the radiation patch on the dielectric substrate; and the radiation patch is configured to convert a linearly polarized radiation signal transmitted via the first transmission port into a circularly polarized radiation signal.

In the antenna provided by the embodiment of the present disclosure, since the radiation patch is used to match with the waveguide feed structure to convert the linearly polarized radiation signal into the circularly polarized radiation signal, a circular polarization radiating element (i.e., the radiation patch) which occupies a small space can be provided, thereby avoiding the increase in the thickness of the antenna.

In some examples, the radiation patch includes a first patch and a second patch, which are connected to each other and disposed in the same layer; the first patch is configured to decompose the linearly polarized radiation signal transmitted via the first transmission port into a first linearly polarized sub-signal and a second linearly polarized sub-signal which are orthogonal and have no phase difference; and the second patch is configured to form the circularly polarized radiation signal from the first linearly polarized sub-signal and the second linearly polarized sub-signal.

In some examples, a shape of the first patch is a centrosymmetric pattern; the second patch includes a first sub-patch and a second sub-patch; and the first sub-patch and the second sub-patch are symmetrically disposed with respect to a symmetric center of the first patch.

In some examples, the shape of the first patch is a square, and an extension direction of a diagonal of the first patch is parallel to a polarization direction of the linearly polarized radiation signal; and the first sub-patch is connected to a first side of the first patch, the second sub-patch is connected to a second side of the first patch, and the first side is opposite to the second side.

In some examples, a side of the first sub-patch connected to the first side is shorter than the first side, and a midpoint of the side of the first sub-patch connected to the first side coincides with a midpoint of the first side; and a side of the second sub-patch connected to the second side is shorter than the second side, and a midpoint of the side of the second sub-patch connected to the second side coincides with a midpoint of the second side.

In some examples, shapes of the first sub-patch and the second sub-patch are semi-circles, a diametric side of the first sub-patch is connected to the first side, and a diametric side of the second sub-patch is connected to the second side; or the shapes of the first sub-patch and the second sub-patch are rectangles, one side of the first sub-patch is connected to the first side, and one side of the second sub-patch is connected to the second side.

In some examples, the first patch, the first sub-patch and the second sub-patch each have a rectangular shape and are connected to form the rectangular radiation patch; and an included angle between an extension direction of a diagonal of the rectangular radiation patch and a polarization direction of the linearly polarized radiation signal ranges from 0° to 45°.

In some examples, each of two short sides of the rectangular radiation patch is provided with a notch, with one notch located at a midpoint of a corresponding short side; and a protrusion is provided at each of two ends of each of the two short sides.

In some examples, the waveguide feed structure includes a ridge waveguide structure; the ridge waveguide structure has at least one side wall which connects to define a waveguide cavity of the ridge waveguide structure; and at least one ridge protruding towards the waveguide cavity is provided along an extension direction of the at least one side wall.

In some examples, the ridge waveguide structure has four side walls which are connected, a first ridge and a second ridge are respectively provided along the extension directions of two opposite side walls, and the polarization direction of the linearly polarized radiation signal is parallel to a line connecting the first ridge to the second ridge.

In some examples, the waveguide feed structure further includes a feed-out waveguide structure connected to the ridge waveguide structure, the feed-out waveguide structure is closer to the dielectric substrate than the ridge waveguide structure, and a transmission port of the feed-out waveguide structure away from the ridge waveguide structure serves as the first transmission port.

In some examples, an orthographic projection of a waveguide cavity of the feed-out waveguide structure on the dielectric substrate is a centrosymmetric pattern.

In some examples, the waveguide feed structure further includes a transition waveguide structure connected between the feed-out waveguide structure and the ridge waveguide structure; and along a direction pointing the feed-out waveguide structure from the ridge waveguide structure, a caliber of a waveguide cavity of the transition waveguide structure continuously and uniformly changes from a caliber of the waveguide cavity of the ridge waveguide structure to a caliber of a waveguide cavity of the feed-out waveguide structure.

In some examples, the dielectric substrate includes a glass substrate, a quartz substrate, a polytetrafluoroethylene glass fiber laminate, a phenolic paper laminate or a phenolic glass cloth laminate; and a thickness of the dielectric substrate ranges from 10 micrometers to 10 millimeters.

In some examples, a material of the radiation patch includes at least one of copper, gold, silver and aluminum.

DETAIL DESCRIPTION OF EMBODIMENTS

Figure 1:
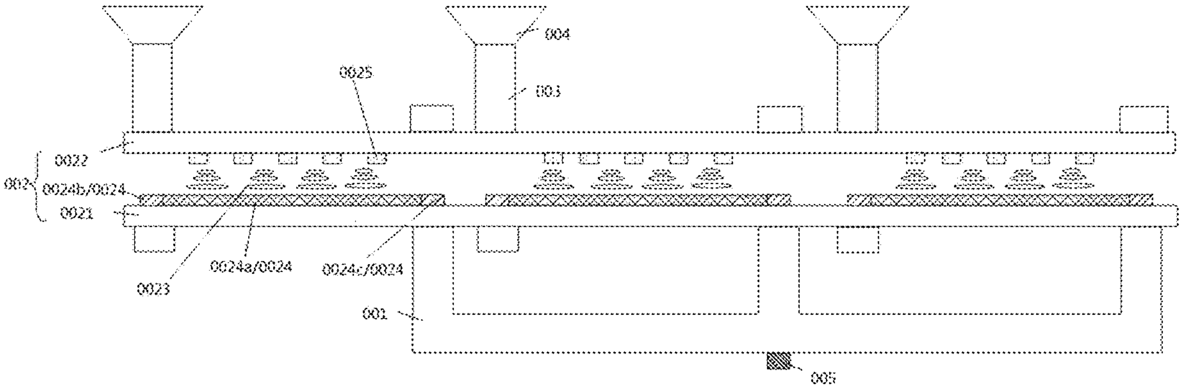
FIG. 1 is a schematic structural diagram of an antenna in the related art.

In order to make the objective, technical solutions and advantages of the present disclosure clearer, the present disclosure will be described in detail below with reference to the drawings. Apparently, the embodiments described herein are merely some embodiments of the present disclosure, and do not cover all embodiments. All other embodiments derived by those of ordinary skill in the art from the embodiments described herein without inventive work fall within the scope of the present disclosure.

The shapes and sizes of the components in the drawings do not reflect a true scale, and are merely intended to facilitate an understanding of the contents of the embodiments of the present disclosure.

Unless otherwise defined, technical terms or scientific terms used herein should have general meanings that are understood by those of ordinary skill in the technical field of the present disclosure. The words "first", "second" and the like used herein do not denote any order, quantity or importance, but are just used to distinguish between different components. Similarly, the words "one", "a", "the" and the like do not denote a limitation to quantity, and indicate the existence of "at least one" instead. The words "include", "comprise" and the like indicate that an element or object before the words covers the elements or the objects or the equivalents thereof listed after the words, rather than excluding other elements or objects. The words "connect", "couple" and the like are not restricted to physical or mechanical connection, but may also indicate electrical connection, whether direct or indirect. The words "on", "under", "left", "right" and the like are only used to indicate relative positional relationships. When an absolute position of an object described is changed, the relative positional relationships may also be changed accordingly.

The embodiments of the present disclosure are not limited to those illustrated by the drawings, but include modifications to configuration formed based on a manufacturing process. Thus, the regions shown in the drawings are illustrative, and the shapes of the regions shown in the drawings illustrate specific shapes of the regions of the elements, but are not intended to make limitations.

Figure 2:
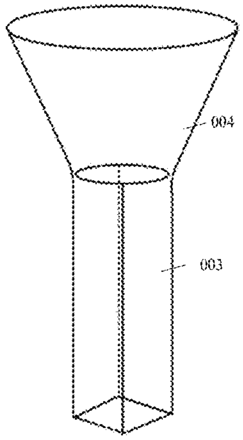
FIG. 2 is a schematic structural diagram of a waveguide rectangular-to-circular converter in the related art.

With reference to FIG. 1 and FIG. 2, an antenna generally includes a pre-feed structure 001, a phase shifter 002, a rectangular waveguide feed structure 003 and a radiating element 004 in the related art. The pre-feed structure 001 receives a radio frequency signal from the outside via an interface 005, and then transmits the radio frequency signal to the phase shifter 002, the phase shifter 002 performs phase shifting on the radio frequency signal, and then inputs the phase-shifted radio frequency signal to the rectangular waveguide feed structure 003, and the rectangular waveguide feed structure 003 feeds the radio frequency signal into the radiating element 004. Since the radio frequency signal transmitted by the rectangular waveguide feed structure 003 is generally in the form of linearly polarized radiation signal, the radiating element 004 adopts a waveguide rectangular-to-circular converter to convert a linearly polarized radiation signal output by the rectangular waveguide feed structure 003 into a circularly polarized radiation signal, so as to match with the rectangular waveguide feed structure 003 and to realize a wider radiation direction. Specifically, with reference to FIG. 2, the radiating element 004 is a circular waveguide having a caliber that gradually decreases from top to bottom, a transmission port at a lower end of the radiating element 004 is connected to the rectangular waveguide feed structure 003, and the radio frequency signal is transmitted by the rectangular waveguide feed structure 003 through the radiating element 004, thus realizing conversion of the linearly polarized radiation signal into the circularly polarized radiation signal. However, the radiating element 004 adopting the waveguide rectangular-to-circle converter is relatively large in size, particularly in longitudinal dimension, resulting in a relatively large thickness of the antenna.

Figure 4:
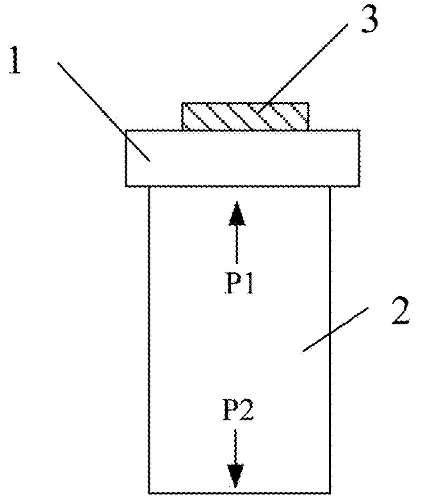
FIG. 4 is an exemplary schematic structural diagram (side view) of an antenna according to the embodiment of the present disclosure.
Figure 5:
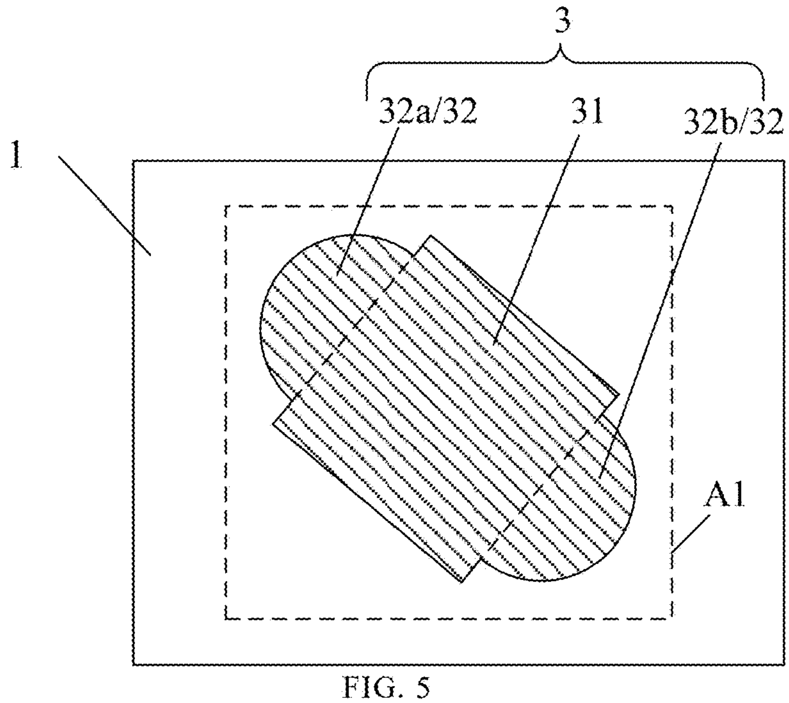
FIG. 5 is an exemplary schematic structural diagram (top view) of an antenna according to the embodiment of the present disclosure.

In order to solve the above technical problem, an embodiment of the present disclosure provides an antenna, with reference to FIG. 4 and FIG. 5, including a dielectric substrate 1, and a radiation patch 3 and a waveguide feed structure 2, which are respectively disposed on two opposite sides of the dielectric substrate 1. The waveguide feed structure 2 has a first transmission port P1 and a second transmission port P2, the first transmission port P1 is closer to the radiation patch 3 than the second transmission port P2, an orthographic projection of the first transmission port P1 on the dielectric substrate 1 at least partially overlaps that of the radiation patch 3 on the dielectric substrate 1, a radio frequency signal enters the waveguide feed structure 2 via the second transmission port P2 and is then transmitted to the radiation patch 3 via the first transmission port P1. The radiation signal transmitted via the first transmission port P1 of the waveguide feed structure 2 is generally a linearly polarized radiation signal, and the radiation patch 3 is configured to convert the linearly polarized radiation signal transmitted via the first transmission port P1 into a circularly polarized radiation signal. Since the radiation patch 3 has a patch structure, that is, the radiation patch 3 is formed by fabricating a conductive layer in a form of a thin film on the dielectric substrate 1 and then patterning the conductive layer, a space (especially a longitudinal space) occupied by the radiation patch 3 is small. Therefore, when applied to the antenna, the radiation patch 3 may not only match with the waveguide feed structure 2 to realize circular polarization conversion of the radiation signal, but may also avoid an increase in the thickness of the antenna.

Figure 3A:
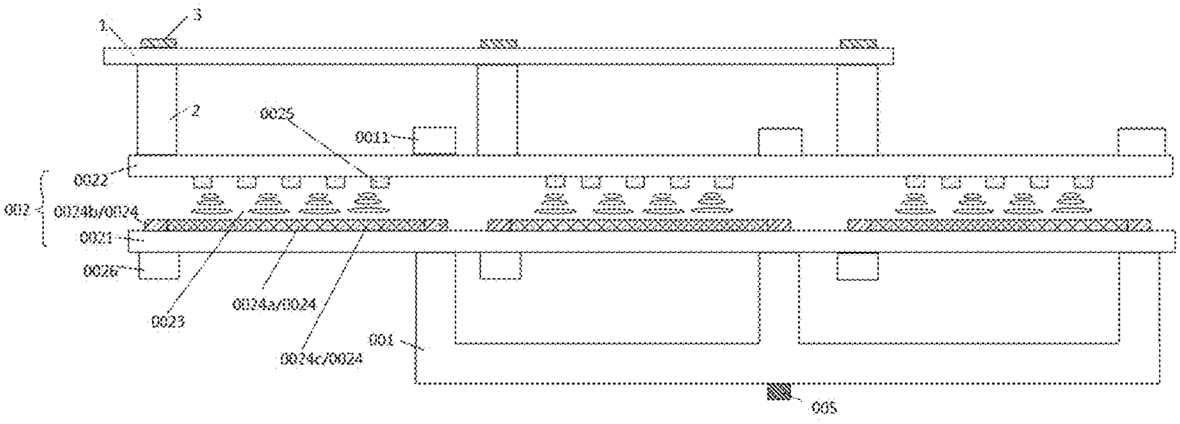
FIG. 3*a* is an exemplary schematic structural diagram (side view) of an antenna according to an embodiment of the present disclosure.
Figure 3B:
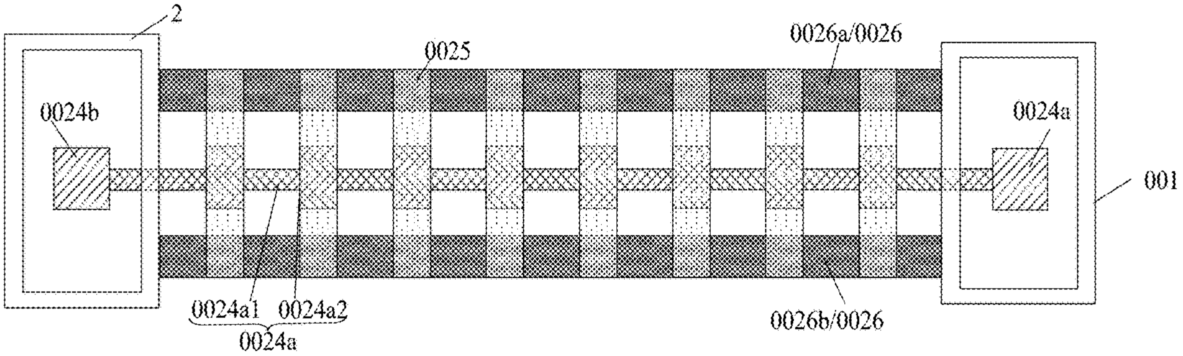
FIG. 3*b* is an exemplary schematic structural diagram (top view) of a coplanar waveguide (CPW) transmission structure of an antenna according to the embodiment of the present disclosure.

An overall structure and an operation principle of the antenna provided by the embodiment are illustrated below with reference to FIG. 3*a* and FIG. 3*b*. FIG. 3*a* shows an exemplary schematic structural diagram (side view) of the antenna, and FIG. 3*b* shows a schematic structural diagram (top view) of a phase shifter 002 in the antenna. The antenna may include a pre-feed structure 001, the phase shifter 002, at least one waveguide feed structure 2, the dielectric substrate 1 and at least one radiation patch 3. The pre-feed structure 001 receives the radio frequency signal from the outside via an interface 005, and then transmits the radio frequency signal to the phase shifter 002, the phase shifter 002 performs phase shifting on the radio frequency signal, and then inputs the phase-shifted radio frequency signal into the second transmission port P2, the waveguide feed structure 2 feeds the radio frequency signal into the radiation patch 3 via the first transmission port P1, and the radiation patch 3 converts the linearly polarized radiation signal output by the waveguide feed structure 2 into a circularly polarized radiation signal.

The phase shifter 002 includes a first substrate and a second substrate, which are disposed opposite to each other, and a dielectric layer disposed therebetween. The first substrate may include a first base 0021, and a transmission structure 0024 disposed on a side of the first base 0021 close to the second substrate; and the second substrate includes a second base 0022, and a patch electrode 0025 disposed on a side of the second base 0022 close to the first substrate. With reference to FIG. 3*b*, taking the transmission structure 0024 being a CPW transmission structure as an example, the transmission structure 0024 includes a central transmission line 0024*a*; a first transmission electrode 0024*b* and a second transmission electrode 0024*c*, which are respectively connected to two ends of the central transmission line 0024*a*; and a reference voltage line 0026 disposed on at least one side of the central transmission line 0024*a*. Taking the reference voltage line including a first reference voltage line 0026*a* and a second reference voltage line 0026*b* as an example, the first reference voltage line 0026*a* and the second reference voltage line 0026*b* are respectively disposed on two sides of the central transmission line 0024*a*, and are kept apart from the central transmission line 0024*a*.

The dielectric layer may adopt various types of tunable media, for example, the dielectric layer may include a tunable medium such as liquid crystal molecules 0023 or a ferroelectric material. Taking the dielectric layer including the liquid crystal molecules 0023 as an example, a deflection angle of the liquid crystal molecules may be changed by applying a voltage to the patch electrode 0025 and the CPW transmission structure, so as to change a dielectric constant of the dielectric layer, thereby achieving phase shifting. In some examples, the liquid crystal molecules 0023 in the dielectric layer are positive liquid crystal molecules or negative liquid crystal molecules. It should be noted that, in a case where the liquid crystal molecules 0023 are the positive liquid crystal molecules, an included angle between a direction of long axes of the liquid crystal molecules 0023 and the patch electrode 0025 is greater than 0° and less than or equal to 45° in the embodiment of the present disclosure; and in a case where the liquid crystal molecules 0023 are the negative liquid crystal molecules, the included angle between the direction of the long axes of the liquid crystal molecules 0023 and the patch electrode 0025 is greater than 45° and less than 90° in the embodiment of the present disclosure. Thus, it may be ensured that the dielectric constant of the dielectric layer is changed after deflection of the liquid crystal molecules 0023, thereby achieving phase shifting.

The pre-feed structure 001 may adopt various types of structures such as a waveguide structure. Taking the pre-feed structure 001 adopting the waveguide structure as an example, the pre-feed structure 001 may include one main waveguide channel, and a plurality of waveguide sub-channels connected thereto. The antenna provided by the embodiment may further include a signal connector 005, one end of the signal connector 005 is connected to an external signal line, the other end of the signal connector 005 is connected to the main waveguide channel of the pre-feed structure 001 to transmit the radio frequency signal, the main waveguide channel divides the radio frequency signal into a plurality of sub-signals, which are respectively coupled to one of the first transmission electrode 0024*b* and the second transmission electrode 0024*c* of the phase shifter through the waveguide sub-channels, and are then transmitted to the other one of the first transmission electrode 0024*b* and the second transmission electrode 0024*c* through the central transmission line 0024*a*, and the other one of the first transmission electrode 0024*b* and the second transmission electrode 0025*c* couples the phase-shifted radio frequency signal to a second transmission port P2 of one corresponding waveguide feed structure 2, the waveguide feed structure 2 feeds the radio frequency signal into the radiation patch 3 via a first transmission port P1, and the radiation patch 3 converts the linearly polarized radiation signal output by the waveguide feed structure 2 into the circularly polarized radiation signal. The signal connector 005 may adopt various types of connectors such as an SMA connector, which is not limited herein.

In addition, it should be noted that the phase shifter 002 may include a plurality of phase adjusting units, each of which corresponds to one or more patch electrodes 0025. After the patch electrodes 0025 and the central signal line 0024*a* of the CPW transmission structure 0024 in each of the phase adjusting units generate an electric field when applied with voltages, the liquid crystal molecules 0023 of the dielectric layer are driven to deflect, so that the dielectric constant of the dielectric layer is changed, which may change a phase of a microwave signal. Moreover, after the voltages are applied to the patch electrodes 0025 and the central signal lines 0024*a* in different phase adjusting units, amounts of phase shift correspondingly adjusted are different, that is, each of the phase adjusting units corresponds to one amount of phase shift. Thus, when phase adjustment is carried out, only the voltages applied to a corresponding phase adjusting unit are controlled according to the magnitude of the amount of phase shift to be realized by the phase adjustment, with no need to apply the voltage to all the phase adjusting units. Therefore, the phase shifter provided by the embodiment is convenient in control and low in power consumption.

In some examples, in order to realize smooth transmission of the radio frequency signal, still with reference to FIG. 3*b*, the central transmission line 0024*a* of the CPW transmission structure 0024 may include, based on the above structure, a main structure 0024*a*1 extending along a length direction of the first base 0021, and branch structures 0024*a*2 distributed on the main structure 0024*a*1 at intervals, and orthographic projections of the patch electrodes 0025 on the first base 0021 at least partially overlap those of the branch structures 0024*a*2 on the first base 0021. In some embodiments, the branch structures 0024*a*2 and the main structure 0024*a*1 may be formed as a single piece, that is, the branch structures 0024*a*2 and the main structure 0024*a*1 are disposed in the same layer and made of the same material, thus facilitating fabrication of the branch structures 0024*a*2 and the main structure 0024*a*1 and reducing process cost. Apparently, the branch structures 0024*a*2 may be electrically coupled to the main structure 0024*a*1 by any means, which is not limited in the embodiment of the present disclosure.

The antenna provided by the embodiment may further include a first reflection structure 0011 and a second reflection structure 0026. The first reflection structure 0011 is disposed on a side of the phase shifter 002 opposite to a transmission port of the pre-feed structure 001, for example, the first reflection structure 0011 may be disposed on a side of the second base 0022 away from the first base 0021. The first reflection structure 0011 may reflect the radio frequency signal, which leaks from the transmission port of the pre-feed structure 001 along a direction away from the transmission port, back to a waveguide cavity of the pre-feed structure 001, so as to effectively increase radiation efficiency. Similarly, the second reflection structure 0026 is disposed on a side of the phase shifter 002 opposite to the transmission port of the waveguide feed structure 2 (that is, away from the dielectric substrate 1), for example, the second reflection structure 0026 may be disposed on a side of the first base 0021 away from the second base 0022. The second reflection structure 0026 may reflect the radio frequency signal, which leaks from the transmission port of the waveguide feed structure 2 along a direction away from the transmission port, back to a waveguide cavity of the waveguide feed structure 2, so as to effectively increase the radiation efficiency.

It should be noted that, the structure of the pre-feed structure 001 and the structure of the phase shifter 002 shown in FIG. 3 are both exemplary structures, and a specific structure of the antenna provided by the embodiment may be implemented in a plurality of ways, which are not limited herein.

In the antenna provided by the embodiment, the radiation patch 3 may adopt various types of structures, and both a shape and a size of the radiation patch 3 may be implemented in a plurality of ways, as long as it may be ensured that a resonant frequency of the radiation patch 3 falls within an operating frequency range of the antenna. A specific structure of the radiation patch 3 is illustrated below by a plurality of examples.

In some examples, with reference to FIG. 5 to FIG. 10, the radiation patch 3 includes a first patch 31 and a second patch 32, which are connected to each other and disposed in the same layer. The first patch 31 is configured to decompose the linearly polarized radiation signal E1 transmitted via the first transmission port P1 of the waveguide feed structure 2 into two orthogonal sub-signals having no phase difference, namely a first linearly polarized sub-signal E11 and a second linearly polarized sub-signal E12. The second patch 32 is configured to form a circularly polarized radiation signal from the first linearly polarized sub-signal E11 and the second linearly polarized sub-signal E12, in other words, the second patch 32 is configured to make the phase difference between the first linearly polarized sub-signal E11 and the second linearly polarized sub-signal E12 to be 90° or 270°.

It should be noted that the first linearly polarized sub-signal E11 and the second linearly polarized sub-signal E12 are equivalent to two mutually perpendicular components obtained by decomposition of the linearly polarized radiation signal E1, so the first linearly polarized sub-signal E11 and the second linearly polarized sub-signal E12 have the same amplitude. Based on the above, if the phase difference between the first linearly polarized sub-signal E11 and the second linearly polarized sub-signal E12 is 90° or 270°, the first linearly polarized sub-signal E11 and the second linearly polarized sub-signal E12 may form the circularly polarized radiation signal.

In some examples, still with reference to FIG. 5 to FIG. 10, a shape of the first patch 31 of the radiation patch 3 may be a centrosymmetric pattern, and the second patch 32 of the radiation patch 3 may include a first sub-patch 32*a* and a second sub-patch 32*b*. The first sub-patch 32*a* and the second sub-patch 32*b* are symmetrically disposed with respect to a symmetric center (e.g., O1 in the drawings) of the first patch 31, and a shape of the first sub-patch 32*a* may be the same as that of the second sub-patch 32*b*. The shape of the first patch 31 of the radiation patch 3 may adopt various types of centrosymmetric patterns, such as a square, a rectangle, a circle and a diamond, which are not limited herein. The shapes of the first sub-patch 32*a* and the second sub-patch 32*b* may include various shapes, such as squares, rectangles, ellipses, circles, diamonds or triangles, which are not limited herein.

Figure 6:
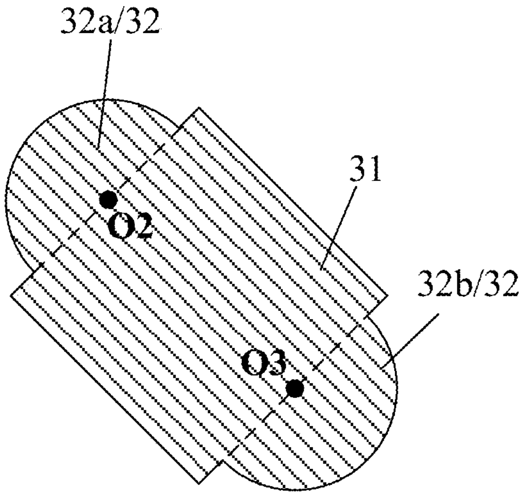
FIG. 6 is an exemplary schematic structural diagram of a radiation patch of an antenna according to the embodiment of the present disclosure.
Figure 7:
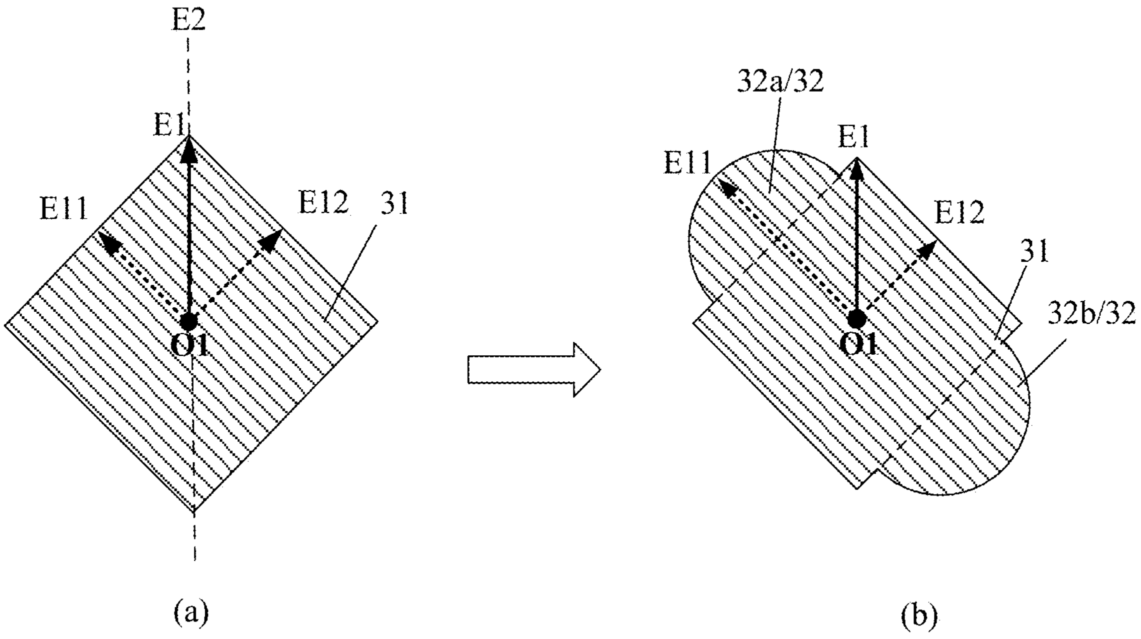
FIG. 7 is a schematic diagram illustrating a circular polarization principle of a radiation patch of an antenna according to the embodiment of the present disclosure.

In some examples, with reference to FIG. 5 to FIG. 8, the shape of the first patch 31 is a square, and an extension direction E2 of a diagonal of the first patch 31 is substantially parallel to a polarization direction E1 of the linearly polarized radiation signal transmitted via the first transmission port P1 of the waveguide feed structure 2, in other words, an included angle between the extension direction E2 of the diagonal of the first patch 31 and the polarization direction E1 of the linearly polarized radiation signal transmitted via the first transmission port P1 of the waveguide feed structure 2 is substantially equal to 0°. Therefore, with reference to FIG. 7(*a*), the square first patch 31 may decompose the linearly polarized radiation signal having the polarization direction E1 into two orthogonal sub-signals having no phase difference, namely the first linearly polarized sub-signal E11 and the second linearly polarized sub-signal E12. The square first patch 31 has four connected sides, with the first side being opposite to the second side and the third side being opposite to the fourth side, the first sub-patch 32*a* is connected to the first side of the first patch 31, the second sub-patch 32*b* is connected to the second side of the first patch 31, in other words, the first sub-patch 32*a* and the second sub-patch 32*b* are disposed opposite to each other along the first patch 31. With reference to FIG. 7(*b*), with the first sub-patch 32*a* or the second sub-patch 32*b* connected to the square first patch 31, a phase of one of the first linearly polarized sub-signal E11 and the second linearly polarized sub-signal E12 may be changed. Taking a case where the phase of the first linearly polarized sub-signal E11 is changed as an example, the phase difference between the first linearly polarized sub-signal E11 and the second linearly polarized sub-signal E12 is changed to be 90° or 270°, so that the first linearly polarized sub-signal E11 and the second linearly polarized sub-signal E12 may form the circularly polarized radiation signal.

Figure 8:
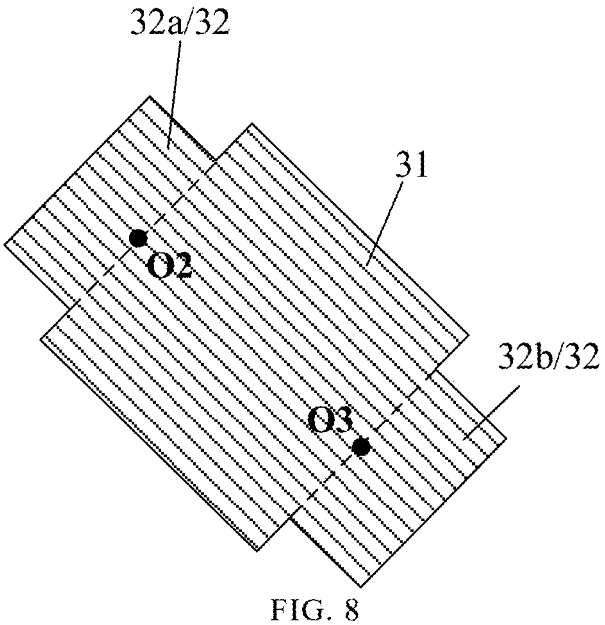
FIG. 8 is another exemplary schematic structural diagram of a radiation patch of an antenna according to the embodiment of the present disclosure.

In some examples, with reference to FIG. 6 and FIG. 8, the first sub-patch 32*a* is connected to the first side of the first patch 31, and a side of the first sub-patch 32*a* connected to the first side may be shorter than the first side, that is, a side length of the first sub-patch 32*a* may be less than that of the first patch 31. In some examples, a midpoint of the side of the first sub-patch 32*a* connected to the first side of the first patch 31 coincides with a midpoint of the first side of the first patch 31 (e.g., 02 shown in the drawings). The second sub-patch 32*b* is connected to the second side of the first patch 31, and a side of the second sub-patch 32*b* connected to the second side may be shorter than the second side, that is, a side length of the second sub-patch 32*b* may be less than that of the first patch 31. In some examples, a midpoint of the side of the second sub-patch 32*b* connected to the second side of the first patch 31 coincides with a midpoint of the second side of the first patch 31 (e.g., 03 shown in the drawings).

In some examples, the shapes of the first sub-patch 32*a* and the second sub-patch 32*b* may include various shapes. For example, with reference to FIG. 6, the shapes of the first sub-patch 32*a* and the second sub-patch 32*b* may be semi-circles, in which case the first sub-patch 32*a* has a curved side and a diameter side and is connected to the first side of the first patch 31 through the diameter side, and similarly, the second sub-patch 32*b* has a curved side and a diameter side and is connected to the second side of the first patch 31 through the diameter side 1. In another example, with reference to FIG. 8, the shapes of the first sub-patch 32*a* and the second sub-patch 32*b* may be rectangles, in which case the first sub-patch 32*a* has four sides and is connected to the first side of the first patch 31 through any one of the four sides, and similarly, the second sub-patch 32*b* has four sides and is connected to the first side of the first patch 31 through any one of the four sides. FIG. 8 illustrates an example where the shapes of the first sub-patch 32*a* and the second sub-patch 32*b* are the rectangles, the first sub-patch 32*a* is connected to the first side of the first patch 31 through a long side, and the second sub-patch 32*b* is connected to the second side of the first patch 31 through a long side.

Figure 9:
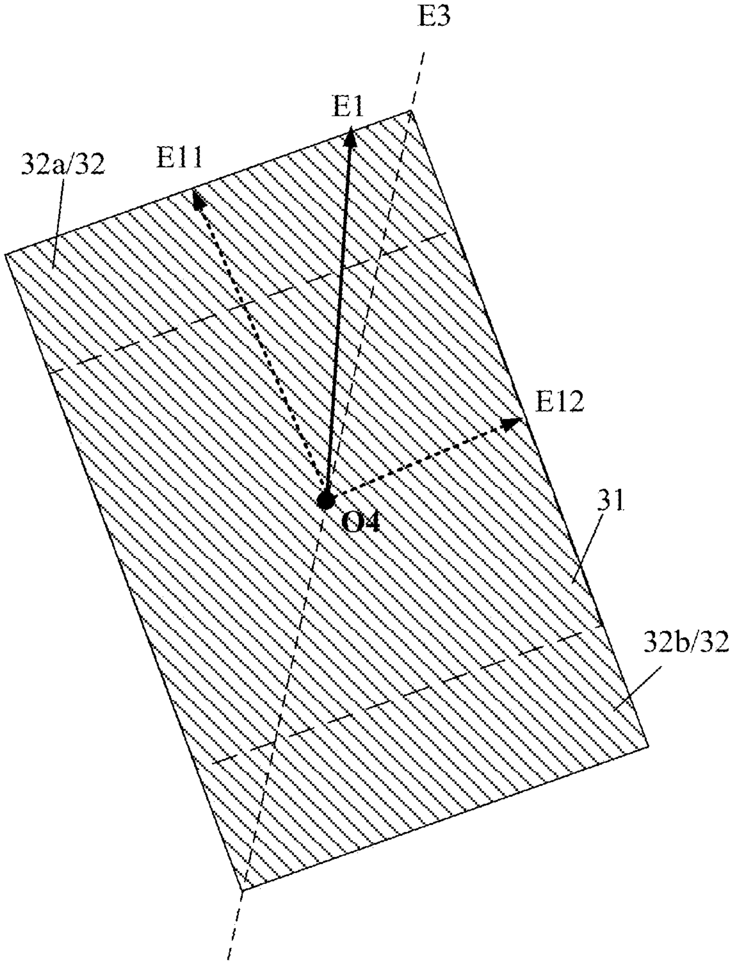
FIG. 9 is another exemplary schematic structural diagram of a radiation patch of an antenna according to the embodiment of the present disclosure.

In some examples, with reference to FIG. 9, each of the first patch 31, the first sub-patch 32*a* and the second sub-patch 32*b* may be rectangular, the first patch 31, the first sub-patch 32*a* and the second sub-patch 32*b* are connected to form the rectangular radiation patch 3. Specifically, each of the first patch 31, the first sub-patch 32*a* and the second sub-patch 32*b* may be rectangular, a length of long sides of the first sub-patch 32*a* and the second sub-patch 32*b* is the same as that of short sides of the first patch 31, the first sub-patch 32*a* is connected to one short side (the first side) of the first patch 31 through a long side of the first sub-patch 32*a*, and the second sub-patch 32*b* is connected to the other short side (the second side) of the first patch 31 through a long side of the second sub-patch 32*b*, thus the first patch 31, the first sub-patch 32*a* and the second sub-patch 32*b* are connected to form a regular rectangle. An included angle between an extension direction E3 of a diagonal of the rectangular radiation patch 3 and the polarization direction of the linearly polarized radiation signal transmitted via the first transmission port P1 of the waveguide feed structure 2 ranges from 0° to 45°. Specifically, the included angle may be adjusted according to a length of each side of the rectangular radiation patch 3, as long as the first linearly polarized sub-signal E11 and the second linearly polarized sub-signal E12 obtained by the decomposition are orthogonal and have a phase difference of 90° or 270°, which is not limited herein.

Figure 10:
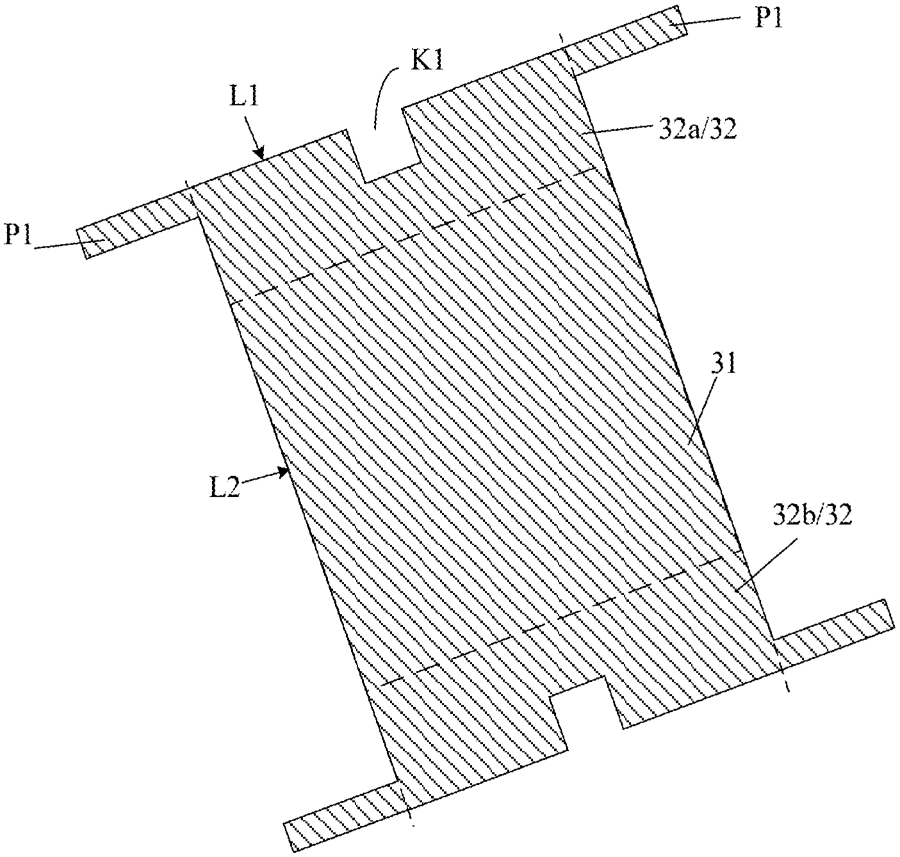
FIG. 10 is another exemplary schematic structural diagram of a radiation patch of an antenna according to the embodiment of the present disclosure.

In some examples, the radiation patch 3 may be further provided with a protrusion or a notch to realize circular polarization of the radiation signal. With reference to FIG. 10, taking the case where each of the first patch 31, the first sub-patch 32*a* and the second sub-patch 32*b* are rectangular and the first patch 31, the first sub-patch 32*a* and the second sub-patch 32*b* are connected to form the rectangular radiation patch 3 as an example, a notch K1 is provided at each of two short sides of the rectangular radiation patch 3, and each notch K1 may be located at a midpoint of the short side where the notch K1 is provided. In some examples, the radiation patch 3 may be further provided with the protrusion, for example, a protrusion P1 is provided at each of two ends of each short side of the radiation patch 3, and an extension direction of each protrusion P1 may be the same as that of the short sides of the radiation patch 3, which is not limited herein.

Apparently, the radiation patch 3 may be implemented in a plurality of other ways, for example, any corner of the rectangular radiation patch 3 may be cut off, so as to make the first linearly polarized sub-signal E11 and the second linearly polarized sub-signal E12 be orthogonal and have a phase difference of 90° or 270°, which is not limited herein.

Figure 11:
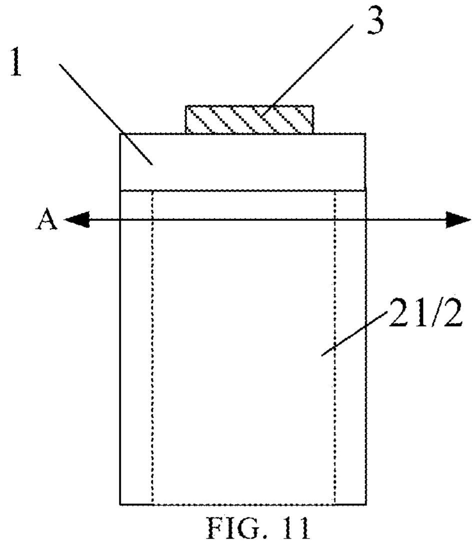
FIG. 11 is another exemplary schematic structural diagram (side view) of an antenna according to the embodiment of the present disclosure.
Figure 12:
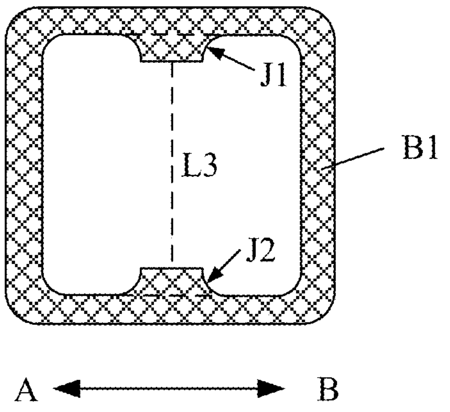
FIG. 12 is a sectional view taken along a direction A-B of FIG. 11.

In some examples, with reference to FIG. 11 to FIG. 15, FIG. 11 and FIG. 13 to FIG. 15 are exemplary side views of the waveguide feed structure 2, and FIG. 12 is a sectional view taken along a direction A-B of FIG. 11. In the antenna provided by the embodiment, the waveguide feed structure 2 includes a ridge waveguide structure 21. The ridge waveguide structure 21 has at least one side wall which connects to define a waveguide cavity of the ridge waveguide structure 21. In a case where the ridge waveguide structure 21 has only one side wall, the ridge waveguide structure 21 is a circular waveguide structure, and a round hollow pipe formed by the one side wall serves as the waveguide cavity of the ridge waveguide structure 21. The ridge waveguide structure 21 may include a plurality of side walls, which are connected to form a waveguide cavity in any of a plurality of shapes. At least one ridge (e.g., J1 or J2 shown in FIG. 12) is provided on at least one side wall of the ridge waveguide structure 21, with the at least one ridge extending along an extension direction of the at least one side wall and protruding towards the interior of the waveguide cavity of the ridge waveguide structure 21.

Figure 13:
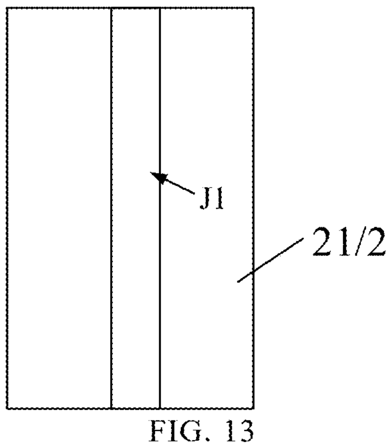
FIG. 13 is another exemplary schematic structural diagram (side view) of an antenna according to the embodiment of the present disclosure.
Figure 15:
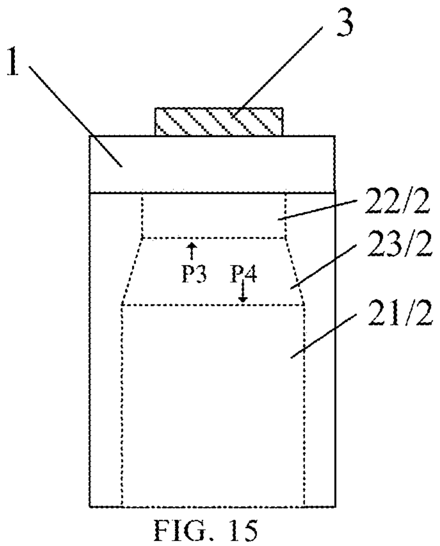
FIG. 15 is another exemplary schematic structural diagram (side view) of an antenna according to the embodiment of the present disclosure.

It should be noted that, in the antenna provided by the embodiment, the waveguide feed structure 2 (including the ridge waveguide structure 21) may be defined by the side wall made of a conductive material (as shown in FIG. 13), or may be obtained by forming a cavity in a whole block of the conductive material (as shown in FIG. 11, FIG. 13 and FIG. 15), which is not limited herein.

In some examples, with reference to FIG. 11 and FIG. 12, taking the ridge waveguide structure 21 including four connected side walls B1 as an example, the four connected side walls B1 define the rectangular waveguide cavity, and a first ridge J1 and a second ridge J2 are respectively provided on inner walls of two opposite side walls B1, and extension directions of the first ridge J1 and the second ridge J2 are parallel to those of the side walls of the ridge waveguide structure 21. For the waveguide feed structure 2 including the ridge waveguide structure 21, due to distribution of the radio frequency signal, the polarization direction E1 of the linearly polarized radiation signal transmitted via the first transmission port P1 of the waveguide feed structure 2 is defined by a direction of a connection line L3 between the first ridge J1 and the second ridge J2, in other words, the polarization direction E1 of the linearly polarized radiation signal transmitted via the first transmission port P1 of the waveguide feed structure 2 is parallel to an extension direction of the connection line L3 between the first ridge J1 and the second ridge J2.

Figure 14:
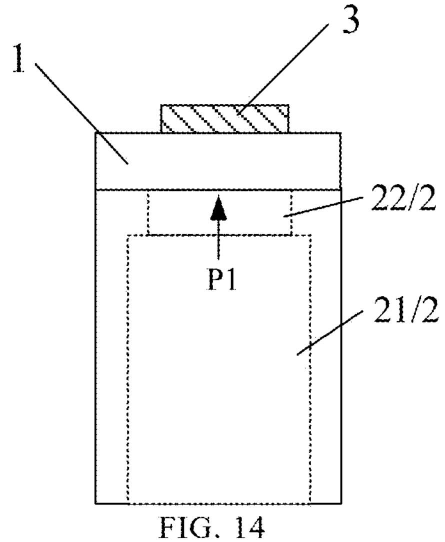
FIG. 14 is another exemplary schematic structural diagram (side view) of an antenna according to the embodiment of the present disclosure.

In some examples, with reference to FIG. 14, the waveguide feed structure 2 includes the ridge waveguide structure 21, and a feed-out waveguide structure 22 connected thereto, the feed-out waveguide structure 22 is closer to the dielectric substrate 1 than the ridge waveguide structure 21. A transmission port of the ridge waveguide structure 21 away from the dielectric substrate 1 receives a radio frequency signal fed in, and feeds the radio frequency signal into the feed-out waveguide structure 22, and the feed-out waveguide structure 22 couples the radio frequency signal to the radiation patch 3 via a transmission port of the feed-out waveguide structure 22 away from the ridge waveguide structure 21, and the feed-out waveguide structure 22 is configured to accumulate energy of the radio frequency signal transmitted by the ridge waveguide structure 21. In the embodiment, the transmission port of the feed-out waveguide structure 22 away from the ridge waveguide structure 21 serves as the first transmission port P1, and the transmission port of the ridge waveguide structure 21 away from the feed-out waveguide structure 22 serves as the second transmission port P2.

In some examples, as described above, the feed-out waveguide structure 22 may be defined by a side wall made of a conductive material, or may be obtained by forming a cavity in a whole block of the conductive material, which is not limited herein. A waveguide cavity of the feed-out waveguide structure 22 may be a waveguide cavity in any shape, such as a rectangular waveguide cavity or a circular waveguide cavity, as long as a shape of the waveguide cavity has a centrosymmetric shape, in other words, an orthographic projection of the waveguide cavity of the feed-out waveguide structure 22 on the dielectric substrate 1 is a centrosymmetric pattern. Further, a caliber of the waveguide cavity of the feed-out waveguide structure 22 may be greater than that of the waveguide cavity of the ridge waveguide structure 21, or less than or equal to that of the waveguide cavity of the ridge waveguide structure 21, which is not limited herein.

In some examples, with reference to FIG. 15, the waveguide feed structure 2 includes the ridge waveguide structure 21, the feed-out waveguide structure 22, and a transition waveguide structure 23 connected therebetween. If the waveguide cavity of the feed-out waveguide structure 22 is different from the waveguide cavity of the ridge waveguide structure 21 in caliber or sectional shape, the transition waveguide structure 23 may function as a connection and transition structure to enable a smooth transition from the caliber and the shape of the waveguide cavity of the ridge waveguide structure 21 to the caliber and the shape of the waveguide cavity of the feed-out waveguide structure 22. Therefore, along a direction pointing to the feed-out waveguide structure 22 from the ridge waveguide structure 21, a caliber and a shape of a waveguide cavity of the transition waveguide structure 23 continuously and uniformly change from a caliber and a shape of a transmission port of the waveguide cavity of the ridge waveguide structure 21 close to the dielectric substrate 1 to a caliber and a shape of a transmission port of the waveguide cavity of the feed-out waveguide structure 22 away from the dielectric substrate 1.

It should be noted that a thickness of the side wall of at least one of the ridge waveguide structure 21, the feed-out waveguide structure 22 and the transition waveguide structure 23 may be four times to six times the skin depth of the transmitted radio frequency signal, which is not limited herein.

In some examples, the waveguide cavity of at least one of the ridge waveguide structure 21, the feed-out waveguide structure 22 and the transition waveguide structure 23 may be provided with a filling medium, so as to increase an overall dielectric constant of the at least one of the ridge waveguide structure 21, the feed-out waveguide structure 22 and the transition waveguide structure 23. The filling medium may include various media such as polytetrafluoroethylene.

In some examples, the dielectric substrate 1 includes any one of a glass substrate, a quartz substrate, a polytetrafluoroethylene glass fiber laminate, a phenolic paper laminate and a phenolic glass cloth laminate, or may be a foam substrate or a Printed Circuit Board (PCB). A thickness of the dielectric substrate ranges from 10 micrometers to 10 millimeters.

In some examples, a material of the radiation patch 3 includes at least one of aluminum, silver, gold, chromium, molybdenum, nickel and iron.

Figure 16:
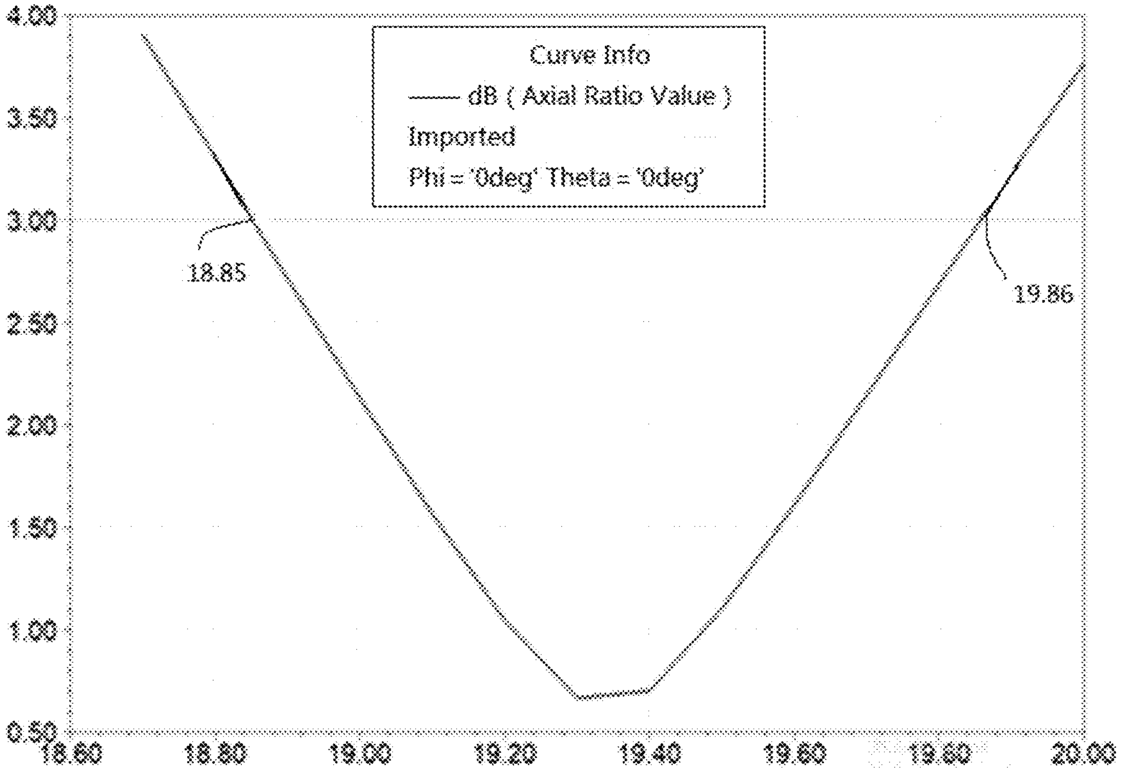
FIG. 16 is a simulation waveform diagram (axial ratio of 1) of an antenna according to the embodiment of the present disclosure.
Figure 17:
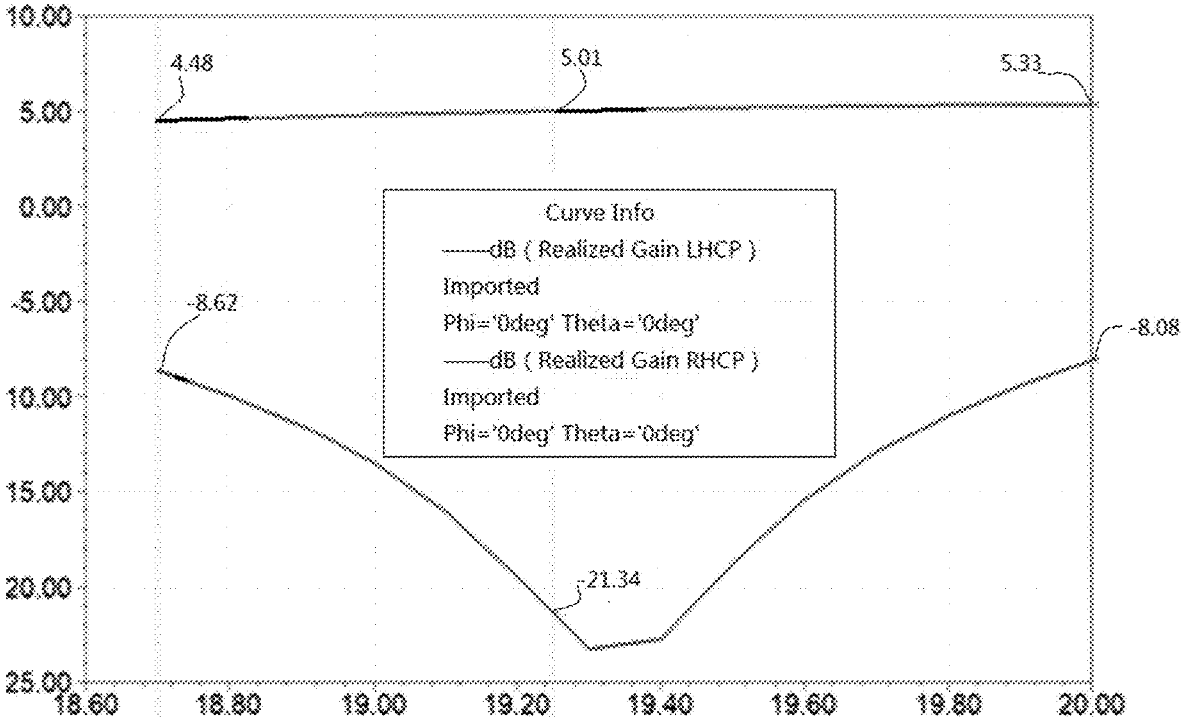
FIG. 17 is a simulation waveform diagram (gain) of an antenna according to the embodiment of the present disclosure.
Figure 18:
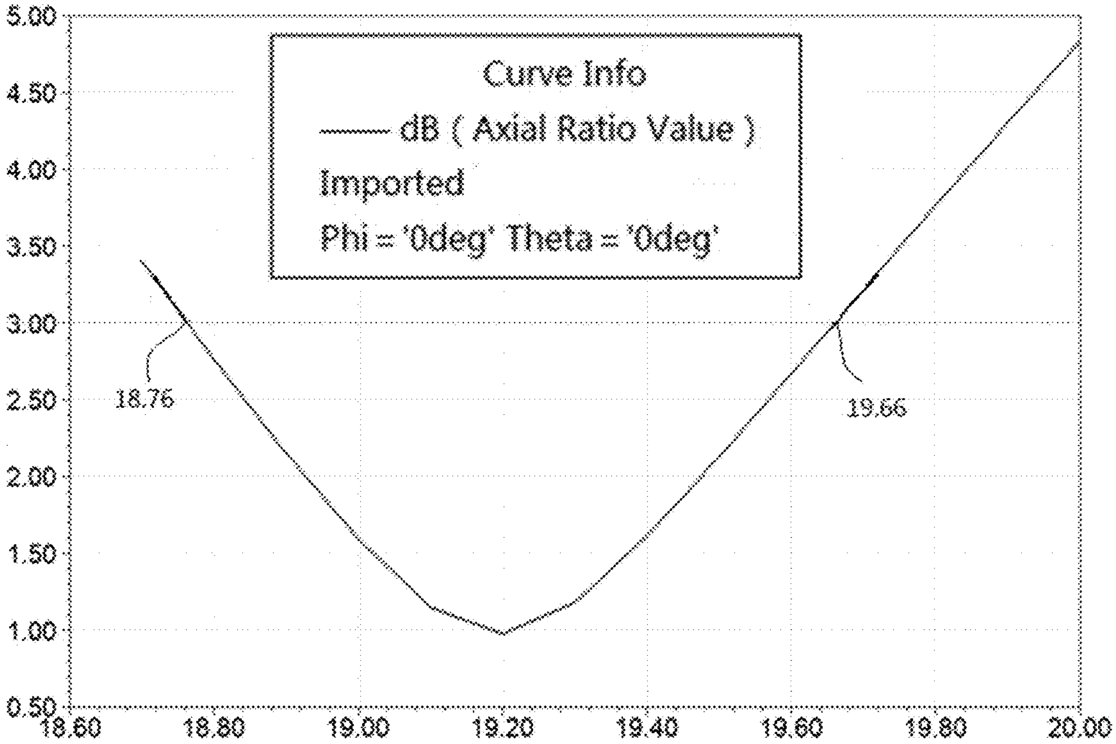
FIG. 18 is a simulation waveform diagram (axial ratio of 2) of an antenna according to the embodiment of the present disclosure.

With reference to FIG. 16 and FIG. 17, simulation is carried out using the antenna provided by the embodiment, and parameters of the antenna in the simulation are as follows: a thickness of the radiation patch 3 is 2 μm, the dielectric substrate is made of glass and has a thickness of 0.5 mm, the waveguide feed structure 2 includes the ridge waveguide structure 21 having a rectangular waveguide cavity and the feed-out waveguide structure 22 having a rectangular waveguide cavity, an outer diameter of the ridge waveguide structure 21 is 8.5 mm×8.5 mm, an inner diameter (i.e., the caliber of the waveguide cavity) of the ridge waveguide structure 21 is 6.5 mm×6.5 mm, and the caliber of the waveguide cavity of the feed-out waveguide structure 22 is 4.5 mm×4.5 mm. FIG. 16 is a waveform diagram of axial ratio simulation of the antenna, and FIG. 17 is a waveform diagram of gain simulation of the antenna. FIG. 18 is a simulation waveform diagram of the antenna in a case where the waveguide cavity of the feed-out waveguide structure 22 of the antenna is a circular waveguide cavity. As can be seen from the simulation waveform diagrams, the antenna provided by the embodiment is excellent both in axial ratio and in gain.

It should be understood that the above implementations are merely exemplary implementations adopted to illustrate the principle of the present disclosure, and the present disclosure is not limited thereto. Various modifications and improvements can be made by those of ordinary sill in the art without departing from the spirit and essence of the present disclosure, and these modifications and improvements are also considered to fall within the scope of the present disclosure.

What is claimed is:

1. An antenna, comprising: a dielectric substrate, and a radiation patch and a waveguide feed structure, which are respectively disposed on two opposite sides of the dielectric substrate, wherein an orthographic projection of a first transmission port of the waveguide feed structure on the dielectric substrate at least partially overlaps an orthographic projection of the radiation patch on the dielectric substrate; and the radiation patch is configured to convert a linearly polarized radiation signal transmitted via the first transmission port into a circularly polarized radiation signal, wherein the radiation patch comprises a first patch and a second patch, which are connected to each other and disposed in the same layer; the first patch is configured to decompose the linearly polarized radiation signal transmitted via the first transmission port into a first linearly polarized sub-signal and a second linearly polarized sub-signal which are orthogonal and have no phase difference; and the second patch is configured to form the circularly polarized radiation signal from the first linearly polarized sub-signal and the second linearly polarized sub-signal, and wherein the second patch is configured to change the phase difference between the first linearly polarized sub-signal and the second linearly polarized sub-signal to 90° or 270°.

2. The antenna of claim 1, wherein a shape of the first patch is a centrosymmetric pattern; the second patch comprises a first sub-patch and a second sub-patch; and the first sub-patch and the second sub-patch are symmetrically disposed with respect to a symmetric center of the first patch.

3. The antenna of claim 2, wherein the shape of the first patch is a square, and an extension direction of a diagonal of the first patch is parallel to a polarization direction of the linearly polarized radiation signal; and the first sub-patch is connected to a first side of the first patch, the second sub-patch is connected to a second side of the first patch, and the first side is opposite to the second side.

4. The antenna of claim 3, wherein a side of the first sub-patch connected to the first side is shorter than the first side, and a midpoint of the side of the first sub-patch connected to the first side coincides with a midpoint of the first side; and a side of the second sub-patch connected to the second side is shorter than the second side, and a midpoint of the side of the second sub-patch connected to the second side coincides with a midpoint of the second side.

5. The antenna of claim 4, wherein shapes of the first sub-patch and the second sub-patch are semi-circles, a diametric side of the first sub-patch is connected to the first side, and a diametric side of the second sub-patch is connected to the second side; or the shapes of the first sub-patch and the second sub-patch are rectangles, one side of the first sub-patch is connected to the first side, and one side of the second sub-patch is connected to the second side.

6. The antenna of claim 2, wherein the first patch, the first sub-patch and the second sub-patch each have a rectangular shape and are connected to form the rectangular radiation patch; and an included angle between an extension direction of a diagonal of the rectangular radiation patch and a polarization direction of the linearly polarized radiation signal ranges from 0° to 45°.

7. The antenna of claim 2, wherein the first patch, the first sub-patch and the second sub-patch are connected, a side of each of the first sub-patch and the second sub-patch away from the first patch is provided with one notch located at a midpoint of the side; and each of the first sub-patch and the second sub-patch further has two protrusions extended in opposite directions away from a corresponding sub-patch.

8. The antenna of claim 1, wherein the waveguide feed structure comprises a ridge waveguide structure; the ridge waveguide structure has at least one side wall which connects to define a waveguide cavity of the ridge waveguide structure; and at least one ridge protruding towards the waveguide cavity is provided along an extension direction of the at least one side wall.

9. The antenna of claim 8, wherein the ridge waveguide structure has four side walls which are connected, a first ridge and a second ridge are respectively provided along the extension directions of two opposite side walls, and the polarization direction of the linearly polarized radiation signal is parallel to a line connecting the first ridge to the second ridge.

10. The antenna of claim 8, wherein the waveguide feed structure further comprises a feed-out waveguide structure connected to the ridge waveguide structure, the feed-out waveguide structure is closer to the dielectric substrate than the ridge waveguide structure, and a transmission port of the feed-out waveguide structure away from the ridge waveguide structure serves as the first transmission port.

11. The antenna of claim 10, wherein an orthographic projection of a waveguide cavity of the feed-out waveguide structure on the dielectric substrate is a centrosymmetric pattern.

12. The antenna of claim 10, wherein the waveguide feed structure further comprises a transition waveguide structure connected between the feed-out waveguide structure and the ridge waveguide structure; and along a direction pointing to the feed-out waveguide structure from the ridge waveguide structure, a caliber of a waveguide cavity of the transition waveguide structure continuously and uniformly changes from a caliber of the waveguide cavity of the ridge waveguide structure to a caliber of a waveguide cavity of the feed-out waveguide structure.

13. The antenna of claim 1, wherein the dielectric substrate comprises a glass substrate, a quartz substrate, a polytetrafluoroethylene glass fiber laminate, a phenolic paper laminate or a phenolic glass cloth laminate; and a thickness of the dielectric substrate ranges from 10 micrometers to 10 millimeters.

14. The antenna of claim 1, further comprising:

a phase shifter and a pre-feed structure, wherein the pre-feed structure is configured to receive a radio frequency signal from the outside and transmit the radio frequency signal to the phase shifter, and the phase shifter is configured to perform phase shifting on the radio frequency signal and input the phase-shifted radio frequency signal to the waveguide feed structure, and the waveguide feed structure is configured to obtain and output the linearly polarized radiation signal from the phase-shifted radio frequency signal.

15. The antenna of claim 14, wherein the phase shifter comprises a transmission structure, and the transmission structure comprises:

a central transmission line, a first transmission electrode and a second transmission electrode connected to both ends of the central transmission line, and a reference voltage line disposed on at least one side of the central transmission line.

16. The antenna of claim 15, wherein the phase shifter further comprises positive liquid crystal molecules and a patch electrode, and an included angle between a direction of long axes of the positive liquid crystal molecules and the patch electrode is greater than 0° and less than or equal to 45°.

17. The antenna of claim 15, wherein the phase shifter further comprises negative liquid crystal molecules and a patch electrode, and an included angle between a direction of long axes of the negative liquid crystal molecules and the patch electrode is greater than 45° and less than 90°.

18. The antenna of claim 15, wherein the central transmission line comprises a main structure extending in a first direction and branch structures distributed on the main structure at intervals.

* * * * *